(12) United States Patent
North et al.

(10) Patent No.: US 11,248,795 B2
(45) Date of Patent: Feb. 15, 2022

(54) FINELY DISTRIBUTED COMBUSTION SYSTEM FOR A GAS TURBINE ENGINE

(71) Applicant: Siemens Energy Global GmbH & Co. KG, Munich (DE)

(72) Inventors: Andrew J. North, Untersiggenthal (CH); Juan Enrique Portillo Bilbao, Oviedo, FL (US); Walter Ray Laster, Oviedo, FL (US); Yuntao Chen, Mülheim an der Ruhr (DE)

(73) Assignee: Siemens Energy Global GmbH & Co KG, Munich (DE)

( * ) Notice: Subject to any disclaimer, the term of this patent is extended or adjusted under 35 U.S.C. 154(b) by 0 days.

(21) Appl. No.: 15/733,516

(22) PCT Filed: Mar. 9, 2018

(86) PCT No.: PCT/US2018/021707
§ 371 (c)(1),
(2) Date: Aug. 18, 2020

(87) PCT Pub. No.: WO2019/172925
PCT Pub. Date: Sep. 12, 2018

(65) Prior Publication Data
US 2020/0386409 A1   Dec. 10, 2020

(51) Int. Cl.
*F23R 3/46*       (2006.01)
*F23R 3/00*       (2006.01)
(Continued)

(52) U.S. Cl.
CPC .................. *F23R 3/46* (2013.01); *F02C 7/12* (2013.01); *F23D 14/62* (2013.01); *F23D 14/82* (2013.01);
(Continued)

(58) Field of Classification Search
CPC .... F23R 3/46; F23R 3/002; F23R 3/06; F23R 3/283; F23R 3/286; F23R 3/34;
(Continued)

(56) References Cited

U.S. PATENT DOCUMENTS 3,691,764 A    9/1972  Ware
4,673,349 A    6/1987  Abe et al.
(Continued)

FOREIGN PATENT DOCUMENTS

| GB | 1377648 A | 12/1974 |
| WO | 9523315 A1 | 8/1995 |
| WO | 9946540 A1 | 9/1999 |

OTHER PUBLICATIONS

A. Van Maaren, D. S. Thung & L. R H. De Goey / Measurement of Flame Temperature and Adiabatic Burning Velocity of Methane/Air Mixtures; Combustion Science and Technology, 96:4-6, 327-344, Published online Apr. 27, 2007.
(Continued)

*Primary Examiner* — Arun Goyal
*Assistant Examiner* — Henry Ng (57) ABSTRACT

A finely distributed combustion system for a gas turbine engine is provided. A combustor body may extend along a longitudinal axis. A premixer space may be formed within the combustor body to premix air and fuel. The premixer space is in communication with an array of finely distributed perforations arranged in a wall of the combustor body to eject an array of premixed main flamelets throughout a contour of the combustor body between the upstream base of the combustor body and the downstream base of the combustor body. The array of finely distributed perforations—potentially comprising thousands or even hundreds of thousands of perforations spatially distributed on a miniaturized scale—for ejecting the premixed main flamelets is technically advantageous compared to conventional distributed
(Continued)

combustion systems, where injection of relatively longer main flames occurs just at a few discrete axial locations.

11 Claims, 5 Drawing Sheets

(51) Int. Cl.
 F23R 3/06 (2006.01)
 F23R 3/28 (2006.01)
 F23R 3/34 (2006.01)
 F23R 3/42 (2006.01)
 F02C 7/12 (2006.01)
 F23D 14/62 (2006.01)
 F23D 14/82 (2006.01)

(52) U.S. Cl.
 CPC ............... *F23R 3/002* (2013.01); *F23R 3/06* (2013.01); *F23R 3/283* (2013.01); *F23R 3/286* (2013.01); *F23R 3/34* (2013.01); *F23R 3/343* (2013.01); *F23R 3/42* (2013.01); *F23D 2203/104* (2013.01); *F23R 2900/03042* (2013.01)

(58) Field of Classification Search
 CPC .. F23R 3/343; F23R 3/42; F23R 2900/03042; F02C 7/12; F02C 7/22; F23D 14/62; F23D 14/82; F23D 2203/104
 See application file for complete search history.

(56) References Cited

U.S. PATENT DOCUMENTS

| | | | | |
|---|---|---|---|---|
| 5,511,516 | A * | 4/1996 | Moore, Jr. | F23D 14/14 122/18.31 |
| 6,140,658 | A * | 10/2000 | Jarvinen | F23D 14/125 250/495.1 |
| 8,375,726 | B2 | 2/2013 | Wiebe et al. | |
| 8,752,386 | B2 | 6/2014 | Fox et al. | |
| 2005/0201906 | A1* | 9/2005 | Alvin | F23R 3/40 422/177 |
| 2007/0204624 | A1 | 9/2007 | Smith et al. | |
| 2015/0276217 | A1* | 10/2015 | Karkow | F23D 11/446 431/328 |
| 2015/0369477 | A1 | 12/2015 | Karkow et al. | |
| 2016/0230984 | A1* | 8/2016 | Colannino | F23C 5/08 |
| 2017/0038063 | A1 | 2/2017 | Colannino et al. | |

OTHER PUBLICATIONS

Hideaki Kobayashia, Katsuhiro Seyamab, Hirokazu Hagiwaraa, Yasuhiro Ogami/ Burning velocity correlation of methane/air turbulent premixed flames at high pressure and high temperature, Proceedings of the Combustion Institute 30 (2005) 827-834.
T. Lachauxa, F. Haltera, C. Chauveaua, I. Gokalpa,*, I.G. Shepherd / Flame front analysis of high-pressure turbulent lean premixed methane—air flames, Proceedings of the Combustion Institute 30 (2005) 819-826, doi:10.1016/j.proci.2004.08.191.
Alexander A. Konnov, Igor V. Dyakov / Measurement of propagation speeds in adiabatic cellular premixed flames of CH4+O2+CO2; Experimental Thermal and Fluid Science 29 (2005) 901-907; Department of Mechanical Engineering, Vrije Universiteit Brussel, 1050 Brussels, Belgium, Received Apr. 14, 2004; accepted January 13, 2005.
Kushal S. Kedia , Ahmed F. Ghoniem / Mechanisms of stabilization and blowoff of a premixed flame downstream of a heat-conducting perforated plate; Combustion and Flame 159 (2012) 1055-1069, Department of Mechanical Engineering, Massachusetts Institute of Technology, 77-Massachusetts Avenue, 3-342, Cambridge, MA 02139, USA, Received January 1, 2011, Received in revised form May 17, 2011, Accepted October 14, 2011, Available online Nov. 19, 2011.
Ahmed Mohamed Gamal Al-Deen Al-Sayed / Characteristics of Partially-Premixed Free Flames Stabilized on Different Perforated Materials, Faculty of Engineering, Cairo University, Giza, Egypt, Jul. 2010 (126 pages).
Hideaki Kobayashi, Teppei Nakashima, Takashi Tamura, Kaoru Maruta and Takashi Niioka / Turbulence Measurements and Observations of Turbulent Premixed Flames at Elevated Pressures up to 3.0 MPa; Combustionand Flame 108:104-117 (1997), Copyright © 1997 by The Combustion Institute, Published by Elsevier Science Inc.
P. Griebel, P. Siewert, P. Jansohn / Flame characteristics of turbulent lean premixed methane/air flames at high pressure: Turbulent flame speed and flame brush thickness; Proceedings of the Combustion Institute 31 (2007) 3083-3090, Paul Scherrer Institut (PSI), Combustion Research, 5232 Villigen PSI, Switzerland.
Vijaykumar Hindasageri, Pramod Kuntikana, Rajendra P. Vedula, Siddini V. Prabhu / An experimental and numerical investigation of heat transfer distribution of perforated plate burner flames impinging on a flat plate; International Journal of Thermal Sciences 94 (2015) 156-169; Department of Mechanical Engineering, Indian Institute of Technology, Bombay, India; Received Apr. 16, 2014, Received in revised form Feb. 28, 2015, Accepted Feb. 28, 2015. Available online Mar. 31, 2015.
M. R. Johnson and L. W. Kostiuk and R. K. Cheng / A Ring Stabilizer for Lean Premixed Turbulent Flames, Combustion and Flame 114:594-596 (1998), 0010-2180/98/$19.00 © 1998 by The Combustion Institute PII S0010-2180(97)00353-2 Published by Elsevier Science Inc, Received Jul. 16, 1997; accepted Nov. 18, 1997.
Kushal S. Kedia, Ahmed F. Ghoniem / An analytical model for the prediction of the dynamic response of premixed flames stabilized on a heat-conducting perforated plate; Proceedings of the Combustion Institute 34 (2013) 921-928, Reacting Gas Dynamics Laboratory, Center for Energy and Propulsion Research, Department of Mechanical Engineering, Massachusetts Institute of Technology, 77-Massachusetts Avenue, 3-342, Cambridge, MA 02139, USA; Available online Jul. 12, 2012.
Ayman Bakry, Ahmed Al-Salaymeh, Ala'a H. Al-Muhtaseb, Ahmad Abu-Jrai, D. Trimis / CO and NOx emissions in porous inert media (PIM) burner system operated under elevated pressure and inlet temperature using a new flame stabilization technique; Chemical Engineering Journal 165 (2010) 589-596; Received Aug. 17, 2010, Received in revised form Sep. 29, 2010, Accepted Sep. 30, 2010.
Cecile Cohe, Christian Chauveau, Iskender Gokalp, Dilek Funda Kurtulus/ CO2 addition and pressure effects on laminar and turbulent lean premixed CH4 air flames; Proceedings of the Combustion Institute 32 (2009) 1803-1810; 2009 The Combustion Institute. Published by Elsevier Inc. All rights reserved. doi:10.1016/j.proci. 2008.06.181.
Hui Liu, Shuai Dong, Ben-Wen Li, Hai-Geng Chen/ Parametric investigations of premixed methane—air combustion in two-section porous media by numerical simulation; Fuel 89 (2010) 1736-1742; 2009 Elsevier Ltd. All rights reserved. doi:10.1016/j.fuel.2009.06. 001, Received Apr. 28, 2009, Received in revised form Jun. 1, 2009, Accepted Jun. 2, 2009, Available online Jun. 21, 2009.
N. Noiray, D. Durox, T. Schuller, S. Candel / Passive control of combustion instabilities involving premixed flames anchored on perforated plates; Proceedings of the Combustion Institute 31 (2007) 1283-1290; Laboratoire EM2C, CNRS and Ecole Centrale Paris, 92295 Chatenay-Malabry, France; 2006 The Combustion Institute. Published by Elsevier Inc. All rights reserved. doi:10. 1016/j.proci.2006.07.096.
José M. N. Rodrigues, Edgar C. Fernandes / Stability Analysis and Flow Characterization of Multi-Perforated Plate Premixed Burners; 17th International Symposium on Applications of Laser Techniques to Fluid Mechanics Lisbon, Portugal, Jul. 7-10, 2014.
Amanda J. Barra, Guillaume Diepvens, Janet L. Ellzey, Michael R. Henneke / Numerical study of the effects of material properties on flame stabilization in a porous burner; Combustion and Flame 134 (2003) 369-379; 2003 The Combustion Institute. All rights reserved.

(56) References Cited

OTHER PUBLICATIONS doi:10.1016/S0010-2180(03)00125-1; Received Sep. 10, 2002; received in revised form Mar. 3, 2003; accepted Mar. 14, 2003.
Ricardo Cabra / Turbulent Jet Flames Into a Vitiated Coflow; NASA/CR—2004-212887; Mar. 2004; 261 pages, NASA Center for Aerospace Information, 7121 Standard Drive, Hanover, MD 21076; National Technical Information Service, 5285 Port Royal Road, Springfield, VA 22100; Available electronically at http://gltrs.grc.nasa.gov.
PCT International Search Report and Written Opinion of International Searching Authority dated Dec. 5, 2019 corresponding to PCT International Application No. PCT/US2018/021707 filed Mar. 9, 2018.

\* cited by examiner

FINELY DISTRIBUTED COMBUSTION SYSTEM FOR A GAS TURBINE ENGINE

BACKGROUND

1. Field

Disclosed embodiments are generally related to turbomachinery, such as gas turbine engines and, more particularly, to a finely distributed combustion system for a gas turbine engine.

2. Description of the Related Art

In turbomachinery, such as a gas turbine engine, fuel is delivered from a fuel source to a combustion section where the fuel is mixed with air and ignited to generate hot combustion products that define working gases. The working gases are directed to a turbine section where they effect rotation of a turbine rotor.

It is known that production of NOx emissions from the burning fuel in the combustion section may be reduced by providing a portion of the fuel to be ignited in a secondary combustion stage located axially downstream from a main combustion stage. This approach is referred to in the art as a distributed combustion system (DCS). See, for example, U.S. Pat. Nos. 8,375,726 and 8,752,386.

Although DCS designs have demonstrated to provide improved combustion performance with relatively low emissions, such as in gas turbine engines used in industrial applications, e.g., involving power generation, further improvements are demanded in view of a fiercely competitive industry subject to ever-increasing thermal efficiency demands in combination with emissions regulations that over time tend to become more restrictive.

BRIEF DESCRIPTION

One disclosed embodiment is directed to a finely distributed combustion system for a gas turbine engine. The combustion system includes a combustor body that may extend along a longitudinal axis of the combustion system between an upstream base of the combustor body and a downstream base of the combustor body. At least one enclosed premixer space may be formed within the combustor body to premix air and fuel. The premixer space is in communication with an array of finely distributed main perforations arranged in a wall of the combustor body to eject an array of premixed main flamelets throughout a contour of the combustor body between the upstream base of the combustor body and the downstream base of the combustor body.

The array of finely distributed main perforations for ejecting the premixed main flamelets is technically advantageous compared to conventional distributed combustion systems, where injection of relatively longer main flames occurs over a few discrete axial locations.

DETAILED DESCRIPTION

The inventors of the present invention have recognized some practical issues that can arise in certain known combustion systems, such as in a distributed combustion system (DCS), as may involve two (or a small number of) discrete axial combustion stages, such as a main combustion stage and a secondary combustion stage. That is, a combustion system distributed over a few discrete, axial locations. Typically, in prior art combustors commonly used in a DCS, the length of the main flames in a DCS tends to be relatively long and may involve a relatively large heat release zone. Thus, the residence time for thermal NOx generation cannot be sufficiently reduced. Furthermore, the relatively long main flames contribute to greater amounts of 'prompt' or 'in-flame' NOx, which cannot be mitigated by reducing residence time.

At least in view of such recognition, the present inventors propose an innovative combustion system designed to avoid or at least reduce the foregoing issues associated with combustion systems involving combustors that form relatively long main flames over a few discrete axial locations. Disclosed embodiments, in a cost-effective and reliable manner effectively improve the concept of axially staged combustion with a design effective to form a finely distributed array of main perforations—potentially comprising thousands or even hundreds of thousands of such perforations—for ejecting a corresponding array of premixed main flamelets having a substantially reduced length compared to the length of main flames in a conventional DCS.

As will be appreciated by one skilled in the art, a reduction in flame length can be shown to be directly proportional to a reduction of jet diameter (e.g., diameter of flame ejector outlet) from which a flame is being ejected. For the sake of illustration, let us presume a prior art combustor having a 5 cm in diameter mains; and let us further presume that if this diameter is reduced from 5 cm to 1 mm (as can be realized in non-limiting examples of disclosed embodiments), then the main flame length would be reduced by a factor of 50. It would thus be appreciated by one skilled in the art that disclosed embodiments can provide a substantial (98% in this non-limiting example) reduction in the main flame length relative to prior art combustors typically used in conventional DCS implementations.

Disclosed embodiments effectively form, in a cost-effective manner, a reliable, finely (e.g., highly) distributed combustion system, as may be made up of a finely distributed array of main perforations for ejecting premixed main flamelets (e.g., premixed main micro-flames), as compared to conventional distributed combustion systems, where the injection of relatively long main flames generally occurs over a few discrete axial locations. In disclosed embodiments, the relatively small size of the fuel and air passages, which form the premixed main flamelets leads to a reduction in the length of the passage, which otherwise would be needed to achieve a well-developed flow. The foregoing approach contrasts with conventional combustion system designs, where the fuel and air pass through lengthy passages, as may involve bulky, discrete parts. Without limitation, this approach facilitates the creation of such passages, such as by material removal from a solid plate material, which allows orders of magnitude greater numbers of main flames to be formed.

Alternatively, the foregoing approach can make use of three-dimensional (3D) Printing/Additive Manufacturing (AM) technologies, such as without limitation laser sintering, selective laser melting (SLM), direct metal laser sintering (DMLS), electron beam sintering (EBS), electron beam melting (EBM) etc., that may be conducive to cost-effectively making disclosed embodiments that, as noted above, may involve various geometries and miniaturized features and/or conduits in the combustion system of the gas turbine engine. For readers desirous of general background information in connection with 3D Printing/Additive Manufacturing (AM) technologies, see, for example, textbook titled "Additive Manufacturing Technologies, 3D Printing, Rapid Prototyping, and Direct Digital Manufacturing", by Gibson I., Stucker B., and Rosen D., 2010, published by Springer, which textbook is incorporated herein by reference. Regardless of the specific manufacturing modality involved in disclosed embodiments, a perforated plate concept, as may involve miniaturized features and/or conduits, which is effective for forming an array of mixed main flamelets spatially distributed on a miniaturized scale comprises the aforementioned "finely distributed combustion system".

In the following detailed description, various specific details are set forth in order to provide a thorough understanding of such embodiments. However, those skilled in the art will understand that disclosed embodiments may be practiced without these specific details, that the aspects of the present invention are not limited to the disclosed embodiments, and that aspects of the present invention may be practiced in a variety of alternative embodiments. In other instances, methods, procedures, and components, which would be well-understood by one skilled in the art have not been described in detail to avoid unnecessary and burdensome explanation.

Furthermore, various operations may be described as multiple discrete steps performed in a manner that is helpful for understanding embodiments of the present invention. However, the order of description should not be construed as to imply that these operations need be performed in the order they are presented, nor that they are even order dependent, unless otherwise indicated. Moreover, repeated usage of the phrase "in one embodiment" does not necessarily refer to the same embodiment, although it may. It is noted that disclosed embodiments need not be construed as mutually exclusive embodiments, since aspects of such disclosed embodiments may be appropriately combined by one skilled in the art depending on the needs of a given application.

The terms "comprising", "including", "having", and the like, as used in the present application, are intended to be synonymous unless otherwise indicated. Lastly, as used herein, the phrases "configured to" or "arranged to" embrace the concept that the feature preceding the phrases "configured to" or "arranged to" is intentionally and specifically designed or made to act or function in a specific way and should not be construed to mean that the feature just has a capability or suitability to act or function in the specified way, unless so indicated.

Several non-limiting terms may be used throughout this disclosure to facilitate explaining structural and/or functional interrelationships between components within the combustion system, and thus it may be helpful to define this terminology to establish a common understanding. Accordingly, these terms and their definitions, unless stated otherwise, are as follows. The terms "forward" and "aft" or "aftward" or similar, without further specificity, refer to the direction toward directions relative to the orientation of the gas turbine. Accordingly, "forward" refers to the compressor end of the engine, while "aftward" refers to the direction toward the turbine end of the engine. Each of these terms, thus, may be used to indicate movement or relative position along a longitudinal central axis of the machine or a component therein. The terms "downstream" and "upstream" are used to indicate position, such as within a given conduit relative to the general direction of a flow moving through it. As will be appreciated, these terms reference a direction relative to the direction of flow expected through the given conduit during normal operation, which should be plainly apparent to those skilled in the art. As such, the term "downstream" refers to the direction in which the fluid is flowing through the given conduit, while "upstream" refers to the opposite of that. Thus, for example, the primary flow of working fluid through a gas turbine, which begins as an air flow moving through the compressor and then becomes a flow of combustion gases within the combustor and beyond, may be described as beginning at an upstream location, at an upstream or forward end of the compressor and flowing downstream eventually toward a location at a downstream or aftward end of the turbine.

Figure 1:
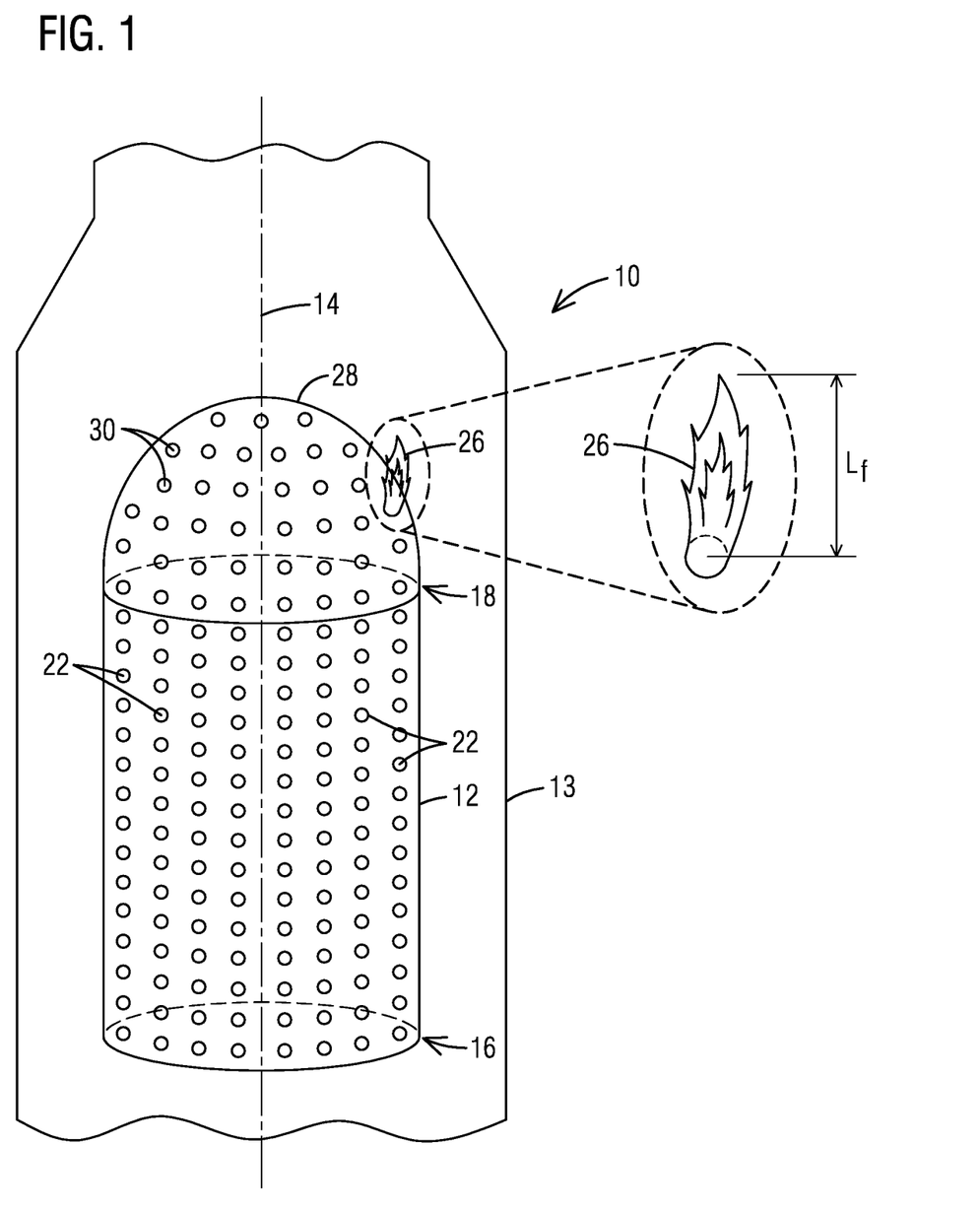
FIG. 1 is a schematic representation of a disclosed combustion system, as may embody, without limitation, a combustor body, such as a cylindrical combustor body, as illustrated in FIG. 1, where the combustor body includes an array of finely distributed main perforations arranged in a wall of the combustor body to eject an array of premixed main flamelets.

FIG. 1 is a schematic representation of a disclosed combustion system 10 for a gas turbine engine, as may embody a combustor body 12, such as without limitation, a cylindrical combustor body that extends inside a liner enclosure 13 along a longitudinal axis 14 of combustion system 10 between an upstream base 16 of combustor body 12 and a downstream base 18 of combustor body 12.

Figure 2:
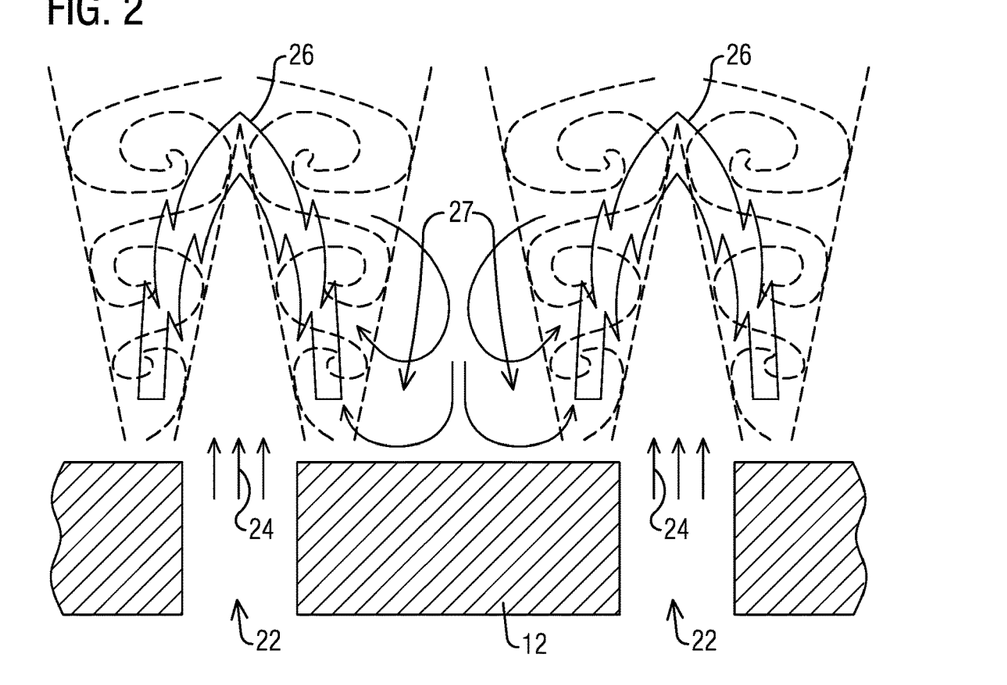
FIG. 2 is a cross-sectional, fragmentary view of a disclosed combustor body including a non-limiting conceptual profile of main flamelets that may be ejected from respective main perforations arranged in the combustor body.

As elaborated in greater detail below, at least one enclosed premixer space (e.g., 21 (FIG. 4)) within combustor body 12 may be used to premix air and fuel (schematically represented by arrows 24 in FIG. 2). Without limitation, respective recirculation zones 27 may be formed between adjacent pairs of perforations 22, where burning products effectively form a flamelet stabilizing feature, which serves to ignite incoming fresh gases, and is thus effective for stabilizing the main flamelets 26. It will be appreciated that disclosed embodiments utilize a sufficiently high perforation density, such that the incoming fuel and air mixture appropriately cools and maintains the combustor body at a temperature below the flash-back/auto-ignition limit. Depending on the needs of a given application, the effects of this self-cooling feature can be enhanced by utilizing a combustor body having a thickness and thermal conductivity sufficiently large to dominate over convective heat transfer from the hot gases to the combustor body in the zones between the perforations.

The enclosed premixer space may be in fluid communication with an array of finely distributed main perforations 22 arranged in a wall of combustor body 12 to eject an array of premixed main flamelets 26 throughout a contour of the combustor body between upstream base 16 of the combustor body and downstream base 18 of the combustor body. As noted above, the array of main perforations 22 constitutes a finely distributed array of perforations—potentially comprising thousands or even hundreds of thousands of perforations spatially distributed on a miniaturized scale—for ejecting premixed main flamelets 26, as compared to conventional distributed combustion systems, where the injection of relatively long main flames occurs over a few discrete axial locations.

As can be appreciated in FIG. 1, in one non-limiting embodiment, a combustor dome 28 may be disposed at downstream base 18 of combustor cylindrical body 12. A further array of finely distributed main perforations 30 may be arranged in a wall of combustor dome 38 to eject a further array of premixed main flamelets throughout a contour of combustor dome 28. It will be appreciated that dome 28 is just one non-limiting example of a structure that may be disposed at downstream base 18 of combustor body 12. In one non-limiting embodiment, upstream base 16 of combustor cylindrical body 12 may comprise an open base to receive a flow of air conveyed into the enclosed premixer space.

As the burning products flow from the upstream base toward the upstream base of the combustor body, this flow is accelerated by the heat release and continuous mass addition provided by the finely distributed array of main perforations, and the main flamelets remain stable in this increasingly high velocity environment, thus facilitating substantially low net residence times as the flow travels between the upstream base and the downstream base of the combustor body. As noted above, the relatively short flame length is conducive to reducing the amount of prompt NOx produced which further reduces the total NOx emissions.

Figure 3:
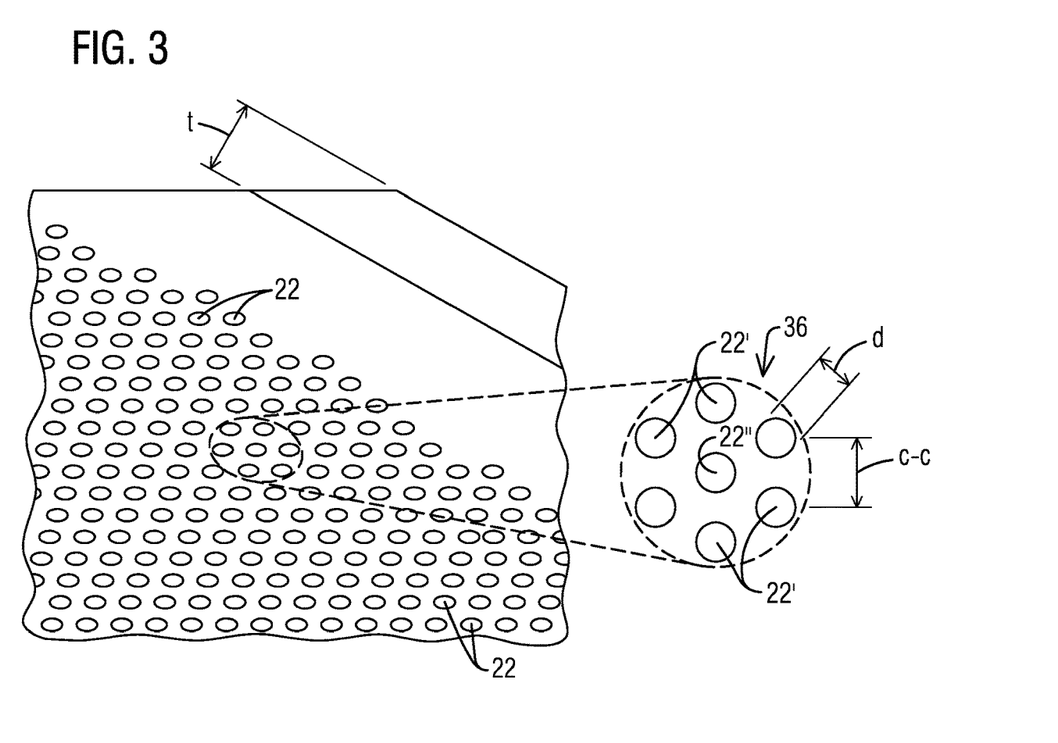
FIG. 3 illustrates a fragmentary, isometric view of an array of finely distributed main perforations in a disclosed combustion system and including a zoomed-in top view schematic of one non-limiting main perforation grouping arrangement.

FIG. 3 illustrates a fragmentary, isometric view of an array of finely distributed perforations 22 in a disclosed combustion system and including a zoomed-in top view schematic of one non-limiting perforation grouping arrangement 36. The zoomed-in view identifies perforation parameters that, without limitation, may be selected for forming the array of finely distributed main flamelets appropriately configured to effectively meet the relatively high energy density involved in a gas turbine engine, (e.g., an industrial gas turbine engine, heavy duty gas turbine engine and other applications) while efficiently meeting the cooling needs of the combustor body without increasing cooling air consumption.

In one non-limiting embodiment, a respective perforation of the array of finely distributed main perforations may comprise a diameter (d) in a range from 0.5 mm to 4 mm. Making use of this miniaturized main perforations is conducive to the self-cooling feature discussed above in the context of FIG. 2, and is further conducive to forming a self-quenching feature, which as will be appreciated by one skilled in the art is conceptually identical to the mechanism by which flame arrestors function.

In one non-limiting embodiment, the wall where a respective perforation of the array of finely distributed main perforations is constructed may comprise a wall thickness (t) in a range from 4 mm to 20 mm.

In one non-limiting embodiment, a respective perforation of the array of finely distributed main perforations may comprise a centrally-arranged main perforation 22" relative to a neighboring group 22' of main perforations in the array of finely distributed main perforations 22, where the neighboring group of perforations 22' defines a hexagonal arrangement. In one non-limiting embodiment, a center-to-center (c-c) distance between the centrally-arranged main perforation and each of the neighboring group of main perforations may comprises a range from 1.5 d to 4 d, where d is the diameter of the main perforations. As noted above, disclosed embodiments can provide a substantial reduction in the main flame length (Lf (FIG. 1)) relative to prior art combustors typically used in conventional DCS implementations.

Figure 4:
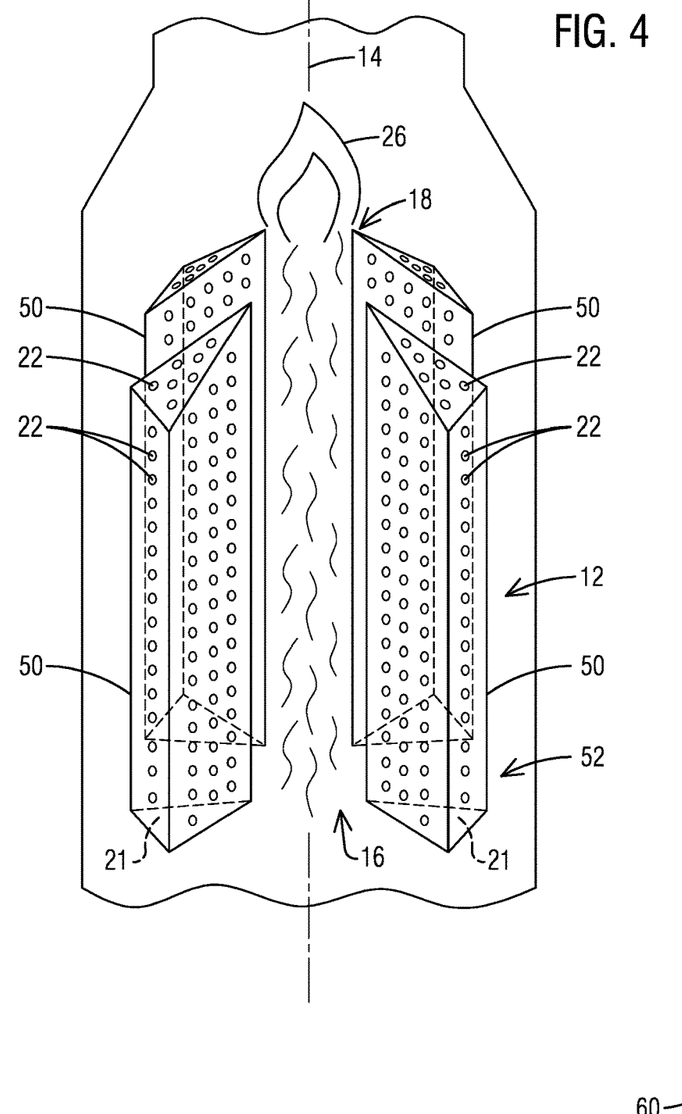
FIG. 4 is a schematic representation of another disclosed combustion system, as may embody, without limitation, planar structures, such as a number of combustor towers. The array of finely distributed main perforations may be constructed on such planar structures to eject the array of premixed main flamelets.

FIG. 4 is a schematic representation of another disclosed combustion system, as may embody, without limitation, planar structures, such as a number of combustor towers 50 extending along longitudinal axis 14 of the combustion system between upstream base 16 of the combustor body and downstream base 18 of the combustor body. The array of finely distributed main perforations 22 may be constructed on such planar structures to eject the array of premixed main flamelets 26.

In one non-limiting embodiment, a respective combustor tower 50 may comprise a respective hollow triangular prism, which contains a premixer enclosed space 21 to premix air and fuel. In one non-limiting embodiment, combustor tower 50 may comprise a truncated triangular prism, for example, comprising at downstream base 18 a triangular face truncated (disposed on a plane) at an oblique angle relative to longitudinal axis 14. It will be appreciated that other combustor tower geometries may be used (e.g., structures other than prisms) depending on the needs of a given application, including combustor towers comprising a cylindrical geometry, as described in the context of FIG. 1.

Figure 5:
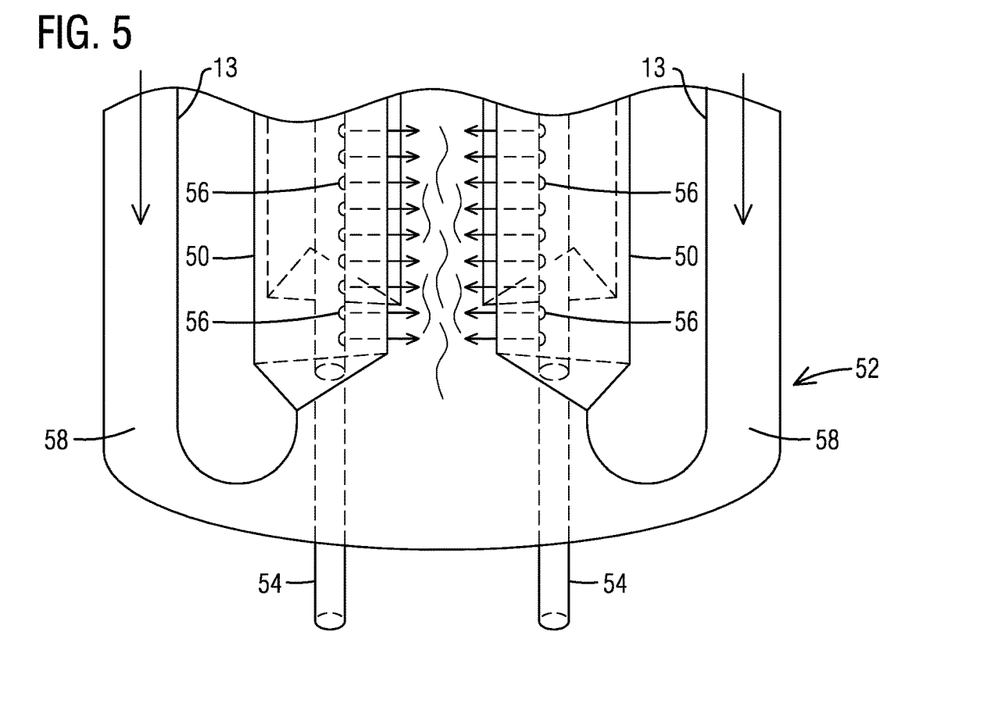
FIG. 5 is a zoomed-in, see-through view of an upstream region of the combustion system shown in FIG. 4, illustrating certain non-limiting structural details relating to a disclosed combustor tower of the combustion system.

FIG. 5 is a zoomed-in, see-through view of an upstream region 52 of the combustion system shown in FIG. 4, illustrating certain non-limiting structural details relating to a disclosed combustor tower 50 of the combustion system. In one non-limiting embodiment, a respective fuel lance 54 may be disposed within a respective tower 50. Fuel lance 54 may include a plurality of fuel ejection orifices 56 arranged along longitudinal axis 14 of the combustion system between the upstream base of the combustor body and the downstream base of the combustor body. In one non-limiting embodiment, an air plenum 58 may be arranged to form an air manifold to convey air into the respective upstream bases of combustor towers 50. As would be appreciated by one skilled in the art, air conveyed by way of air plenum 58 constitutes the air to be premixed in premixer enclosed space 21 (FIG. 4) with the fuel conveyed by the respective fuel lances 54.

Figure 6:
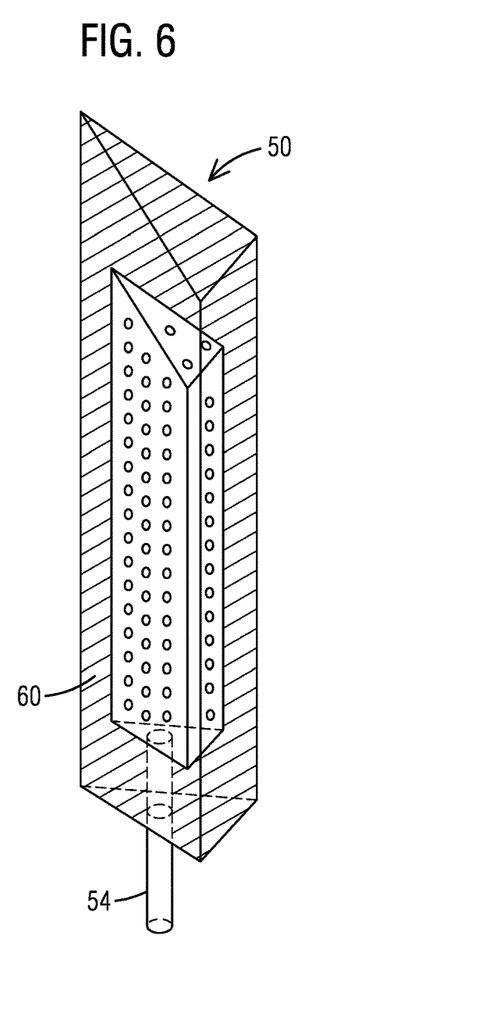
FIG. 6 is an isometric view of an alternative embodiment of a disclosed combustor tower, as may be filled with a metal porous media to avoid or at least reduce occurrence of flashback events.

FIG. 6 is an isometric view of an alternative embodiment of a disclosed combustor tower 50, as may be filled with a metal porous media 60 to, for example, avoid or at least reduce occurrence of flashback events. That is, premixer enclosed space 21 (FIG. 4) may be filled with metal porous media 60, which is effective to reduce the volume of premixed fuel and air and can enhance fuel/air premixing in the relatively compact scale involved in disclosed embodiments. Additionally, metal porous media 60 can effectively serve as an effective flame arrestor, which, as will be appreciated by one skilled in the art, in turn is effective to halt flame propagation.

Figure 7:
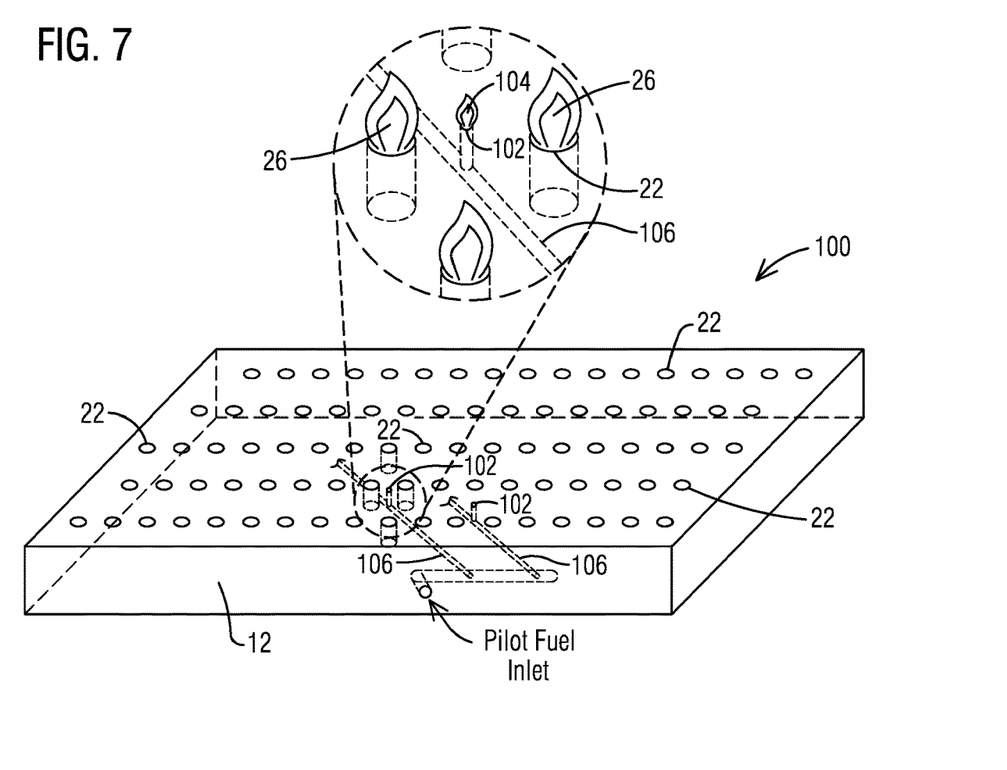
FIG. 7 is an isometric view of an embodiment including an array of finely distributed diffusion pilot perforations to eject diffusion pilot flamelets in a disclosed combustion system. In this embodiment, the array of finely distributed diffusion pilot perforations may be interspersed with the array of finely distributed main perforations.

FIG. 7 is an isometric view of a further disclosed combustion system as may embody an array of finely distributed diffusion pilot perforations 102 arranged to eject diffusion pilot flamelets 104 interspersed with the array of finely distributed premixed main flamelets for performing a loading of the gas turbine engine.

Without limitation, during steady state operation, fuel flow to the finely distributed diffusion pilot perforations 102 may be set to zero or certain minimum value, as needed to maintain stability in the premixed main flamelets, and suppress unwanted combustor dynamics. During transients, fuel to the distributed diffusion pilot perforations 102 may be set to certain higher value to take advantage of the stability enhancement provided by the finely distributed diffusion pilot perforations 102. Disclosed embodiments, as may integrate, an array of finely distributed main premixed main flamelets with a finely distributed array of diffusion pilot flamelets is believed to be conducive to maintain emissions compliance during startup, and to handle variations in gas turbine emissions during load changes without compromising combustion dynamics.

As can be appreciated in FIG. 7, respective pilot fuel-conveying conduits 106 may be constructed within the wall of combustor body 12. Without limitation, one or more of the respective pilot fuel-conveying conduits 106 may be in fluid communication with one or more of respective diffusion pilot perforations 102. As noted above, the inclusion of the array of finely distributed diffusion pilot perforations 102 is effective for enhancing main flame stabilization, and for allowing greater in-hole velocities for the main jets (e.g., main flamelets). The increased in-hole velocities in turn enhances the cooling effectiveness of the incoming cool fuel/air stream and reduce a propensity for the flames to propagate back through the perforations, such as into the premixer enclosed spaces 21 (FIG. 4). In addition to the benefit of flash-back risk reduction, the stabilization effect of the diffusion pilot perforations 102 on the main flamelets, allows substantially reduced thermoacoustic instabilities in the combustion system, particularly during transients. Without limitation, diffusion pilot perforations 102 may involve parametric ranges varying approximately from ⅛ to 1/12 compared to the parametric ranges discussed in the context of FIG. 3 in connection with main perforations 22.

Figure 8:
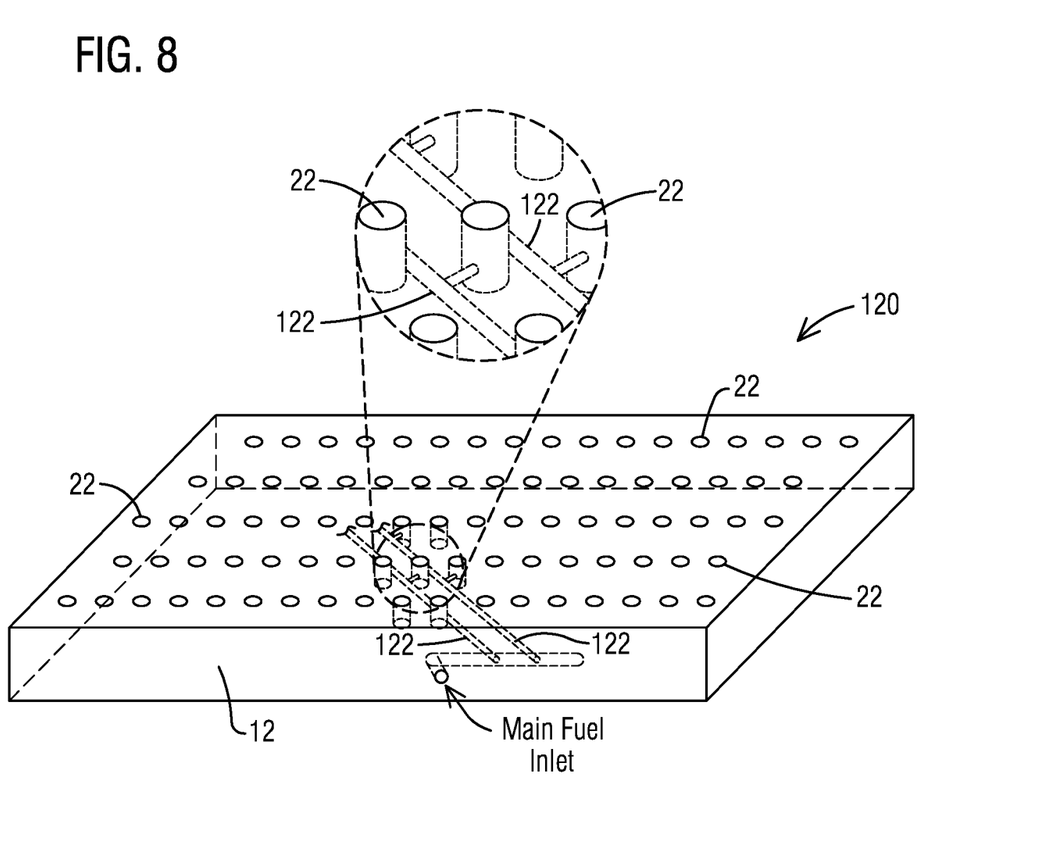
FIG. 8 is an isometric view of an alternative embodiment of an array of finely distributed main perforations in a disclosed combustion system, where main fuel-conveying conduits may be constructed within the wall of the combustor body to convey the fuel for forming the premixed main flamelets.

FIG. 8 is an isometric view of an alternative embodiment of an array of finely distributed perforations 120 in a disclosed combustion system, where main fuel-conveying conduits 122 may be constructed within the wall of combustor body 12 to convey the fuel for forming the premixed main flamelets ejected through perforations 22. This construction is believed to reduce the potential flashback occurrence of a plenum filled with premixed fuel and air. It will be appreciated that the respective views shown in FIGS. 7 and 8—illustrating planar structures—should be construed in a non-limiting sense since analogous structural and/operational relationships can be readily incorporated in disclosed embodiments involving non-planar structures.

In operation, disclosed embodiments are believed to provide at least the following technical advantages: 1) substantially reducing the size of the heat release zone, and in turn substantially reducing the amount of prompt NOx that otherwise could be formed; 2) a finely distributed array of main flamelet injection locations reduces the residence time during which thermal NOx can be generated; 3) the relatively "quiet" (e.g., low-turbulence) nature of the main flamelets formed as well as the finely distributed heat release feature is effective to reduce thermoacoustic feedback mechanisms and provides a self-damping effect; 4) the high degree of design versatility of various compact geometric configurations that are feasible in disclosed embodiments makes such designs realizable in a cost-effective manner for a large variety of gas turbine engine applications with minimal modification; 5) ability to withstand a significant increase in turbine inlet temperature while still meeting NOx emissions targets; 6) a reduced thermoacoustic feedback can increase the operational life of disclosed combustion systems.

While embodiments of the present disclosure have been disclosed in exemplary forms, it will be apparent to those skilled in the art that many modifications, additions, and deletions can be made therein without departing from the scope of the invention and its equivalents, as set forth in the following claims.

What is claimed is:

1. A finely distributed combustion system for a gas turbine engine, the finely distributed combustion system comprising:
   a plurality of combustor towers extending along a longitudinal axis of the finely distributed combustion system between an upstream base of the plurality of combustor towers and a downstream base of the plurality of combustor towers,
   wherein each combustor tower of the plurality of combustor towers comprises a wall, which defines an array of finely distributed perforations, extending between the upstream base and the downstream base,
   wherein each combustor tower of the plurality of combustor towers comprises a hollow triangular prism interior which defines a respective enclosed premixer space to premix air and fuel,
   wherein the plurality of combustor towers are circumferentially arranged around a central channel located along the longitudinal axis and are enclosed by a liner structure, and
   wherein the array of finely distributed perforations is configured to eject an array of premixed main flamelets from the respective enclosed premixer space to the central channel.

2. The finely distributed combustion system of claim 1, wherein the upstream base comprises an open base to receive a flow of air conveyed to the respective enclosed premixer space.

3. The finely distributed combustion system of claim 2, further comprising respective main fuel-conveying conduits constructed within the wall, wherein at least one of the respective main fuel-conveying conduits is in fluid communication with the respective enclosed premixer space.

4. The finely distributed combustion system of claim 1, wherein at least a portion of the wall comprises an array of finely distributed diffusion pilot perforations arranged to eject diffusion pilot flamelets interspersed with at least some of the array of premixed main flamelets for performing loading of the gas turbine engine.

5. The finely distributed combustion system of claim 4, further comprising respective pilot fuel-conveying conduits constructed within the wall, wherein at least one of the respective pilot fuel-conveying conduits is in fluid communication with one or more of respective diffusion pilot perforations of the array of finely distributed diffusion pilot perforations.

6. The finely distributed combustion system of claim 1, further comprising a fuel lance within at least one combustor tower of the plurality of combustor towers, the fuel lance comprising fuel ejection orifices arranged along the longitudinal axis of the finely distributed combustion system between the upstream base and the downstream base.

7. The finely distributed combustion system of claim 1, wherein a respective perforation of the array of finely distributed perforations comprises a diameter in a range from 0.5 mm to 4 mm.

8. The finely distributed combustion system of claim 1, wherein the wall where a respective perforation of the array of finely distributed perforations is constructed comprises a wall thickness in a range from 4 mm to 20 mm.

9. The finely distributed combustion system of claim 1, wherein a respective perforation of the array of finely distributed perforations comprises a centrally-arranged perforation relative to a neighboring group of perforations in the array of finely distributed perforations, wherein the neighboring group of perforations defines a hexagonal arrangement.

10. The finely distributed combustion system of claim 9, wherein a center-to-center distance between the centrally-arranged perforation and each of the neighboring group of perforations comprises a range from 1.5 d to 4 d, where d comprises a diameter of a perforation of the neighboring group of perforations.

11. The finely distributed combustion system of claim 1, wherein the hollow triangular prism interior is filled with a porous metal media and comprises respective finely distributed perforations of the array of finely distributed perforations.

* * * * *